(12) United States Patent
Tran et al.

(10) Patent No.: US 8,102,842 B2
(45) Date of Patent: *Jan. 24, 2012

(54) INTEGRATED SWITCH

(75) Inventors: Thanh Tran, Anaheim, CA (US); Henry Chou, Anaheim, CA (US); Scott Denton, Carlsbad, CA (US); Andrew Hwang, Redondo Beach, CA (US)

(73) Assignee: Broadcom Corporation, Irvine, CA (US)

( * ) Notice: Subject to any disclaimer, the term of this patent is extended or adjusted under 35 U.S.C. 154(b) by 208 days.

This patent is subject to a terminal disclaimer.

(21) Appl. No.: 11/832,440

(22) Filed: Aug. 1, 2007

(65) Prior Publication Data

US 2008/0031270 A1 Feb. 7, 2008

Related U.S. Application Data

(60) Provisional application No. 60/835,466, filed on Aug. 4, 2006, provisional application No. 60/929,096, filed on Jun. 13, 2007.

(51) Int. Cl.
 *H04L 12/50* (2006.01)
(52) U.S. Cl. ........................................ 370/359; 370/360
(58) Field of Classification Search ....................... None
 See application file for complete search history.

(56) References Cited

U.S. PATENT DOCUMENTS

| | | | | |
|---|---|---|---|---|
| 5,249,183 A * | 9/1993 | Wong et al. | .................... | 370/228 |
| 5,818,426 A | 10/1998 | Tierney et al. | | |
| 6,112,273 A * | 8/2000 | Kau et al. | ..................... | 710/260 |
| 6,504,851 B1 * | 1/2003 | Abler et al. | .................... | 370/466 |
| 6,665,163 B2 * | 12/2003 | Yanagisawa | .................. | 361/103 |
| 6,900,686 B1 | 5/2005 | Roo | | |
| 7,218,566 B1 * | 5/2007 | Totolos et al. | ................ | 365/222 |
| 7,271,641 B1 * | 9/2007 | Roo | .............................. | 327/404 |
| 7,484,026 B2 * | 1/2009 | Burnham et al. | ............. | 710/303 |
| 2002/0010818 A1 * | 1/2002 | Wei et al. | ......................... | 710/62 |
| 2003/0048794 A1 | 3/2003 | Sato et al. | | |
| 2003/0108032 A1 | 6/2003 | Kato | | |
| 2003/0210779 A1 | 11/2003 | Bremer et al. | | |
| 2004/0029620 A1 * | 2/2004 | Karaoguz | ...................... | 455/574 |
| 2004/0095118 A1 * | 5/2004 | Kernahan | ...................... | 323/282 |
| 2005/0083751 A1 | 4/2005 | Fujiu et al. | | |

(Continued)

OTHER PUBLICATIONS

U.S. Patent & Trademark Office. Mail Stop PCT, Attention: ISA/US. PCT International Search Report dated Feb. 4, 2008. International Application No. PCT/US07/17256. International Filing Date: Aug. 2, 2007. 4 pages.

(Continued)

*Primary Examiner* — Robert Scheibel
*Assistant Examiner* — Eunsook Choi
(74) *Attorney, Agent, or Firm* — Sterne, Kessler, Goldstein & Fox PLLC

(57) ABSTRACT

Switching between communication ports of a notebook is typically accomplished using an off-chip local area network (LAN) switch or an off-chip high speed analog multiplexer. This off-chip component is disadvantageous for several reasons, including: added cost of an additional component; increased overall power consumption because transmit amplitude loss; and reduced cable reach and link performance due to hybrid mismatch and signal distortions. To reduce cost and preserve electrical and networking performance, an integrated switch is provided to multiplex signals of a networking communication chip to multiple network paths.

11 Claims, 6 Drawing Sheets

U.S. PATENT DOCUMENTS

| | | | |
|---|---|---|---|
| 2006/0033626 A1* | 2/2006 | Collins | 340/573.1 |
| 2006/0077276 A1* | 4/2006 | Noguchi | 348/312 |
| 2006/0104017 A1* | 5/2006 | Chang et al. | 361/683 |
| 2006/0176088 A1* | 8/2006 | Fujiu et al. | 327/143 |
| 2007/0140424 A1* | 6/2007 | Serceki | 378/62 |
| 2008/0178304 A1* | 7/2008 | Jeansonne et al. | 726/34 |
| 2008/0266089 A1* | 10/2008 | Haren et al. | 340/568.1 |
| 2008/0278894 A1* | 11/2008 | Chen et al. | 361/681 |
| 2010/0234099 A1* | 9/2010 | Rasmussen et al. | 463/29 |

OTHER PUBLICATIONS

U.S. Patent & Trademark Office. Mail Stop PCT, Attention: ISA/US. PCT Written Opinion of the International Searching Authority dated Feb. 4, 2008. International Application No. PCT/US07/17256. International Filing Date: Aug. 2, 2007. 6 pages.

* cited by examiner

INTEGRATED SWITCH

CROSS REFERENCE TO RELATED APPLICATIONS

This application is a Non-Provisional of U.S. Provisional Application Ser. No. 60/835,466 filed Aug. 4, 2006 by TRAN, Thanh et al., entitled INTEGRATED E-SWITCH FOR A MOBILE GIGABIT ETHERNET CONTROLLER, the entire contents of which is incorporated by reference and for which priority benefit is claimed under Title 35, United States Code 119(e). This application also claims priority benefit to U.S. Provisional Application Ser. No. 60/929,096 filed on Jun. 13, 2007 by TRAN, Thanh et al, entitled INTEGRATED SWITCH, the entire contents of which is incorporated by reference and for which priority benefit is also claimed under Title 35, United States Code 119(e).

BACKGROUND

The present invention relates to a data switch.

Portable devices such as notebooks, personal digital assistants (PDA), and mobile phones are usually designed to operate in multiple networking environments. For example, a notebook usually has multiple means of connecting to a network. Depending on the environment, the user of the notebook may opt to connect to a network wirelessly, using IEEE 802.11 or HomeRF wireless communication standard. The user may also opt to connect to the network using a more secure connection such as a direct wire connection to a local area network (LAN) using an unshielded twisted pair (UTP) cable terminated with a RJ-45 plug (RJ-45 Cable), for example.

To enable connection flexibility and portability, notebooks must be designed with the ability to switch from one type of network connection to another, such as from a wireless connection to a wire connection, or from one network communication port to another network communication port. Notebooks typically have multiple network communication ports such as an 802.11 wireless communication port, a RJ-45 compatible network port, and a docking station network port. Conventionally, a notebook is switched to operate with the RJ-45 network port or the docking station port by using an off-chip local area network (LAN) switch or an off-chip high speed analog multiplexer, which is located between the output of the notebook's physical layer device (PHY) and the RJ-45 and docking station ports. In other words, the LAN switch is separate and distinct from the PHY chip. Although the example above relates to notebooks, other types of devices (e.g., desktop and other portable devices) with networking ability may encounter the same issues.

This extra hardware between the notebook's PHY and the network communication ports is disadvantageous for several reasons, including: added cost of additional components; increased overall power requirements because of the extra components and higher PHY power that is needed to offset transmit amplitude loss; and reduced cable reach and link performance due to hybrid mismatch and signal distortions. Accordingly, what is needed is a gigabit controller without the above disadvantages.

BRIEF DESCRIPTION OF THE DRAWINGS/FIGURES

The invention is described below by way of exemplary embodiments with reference to the accompanying drawings.

DETAILED DESCRIPTION

This specification describes exemplary embodiments that incorporate features of the invention. The embodiment(s) described, and references in this specification to "one embodiment", "an embodiment", "an example embodiment", etc., indicate that the embodiment(s) described may include a particular feature, structure, or characteristic, but every embodiment may not necessarily include the particular feature, structure, or characteristic. Thus, the invention includes more subject matter than may be shown in a single exemplary embodiment. Moreover, such phrases are not necessarily referring to the same embodiment. When a particular feature, structure, or characteristic is described in connection with an embodiment, it is understood that it is within the knowledge of one skilled in the art to effect such feature, structure, or characteristic in connection with other embodiments whether or not explicitly described. An embodiment of the present invention is now described. While specific methods and configurations are discussed, it should be understood that this is done for illustration purposes only. A person skilled in the art to which the invention pertains will recognize that other configurations and procedures may be used without departing from the spirit and scope of the invention.

Figure 1:
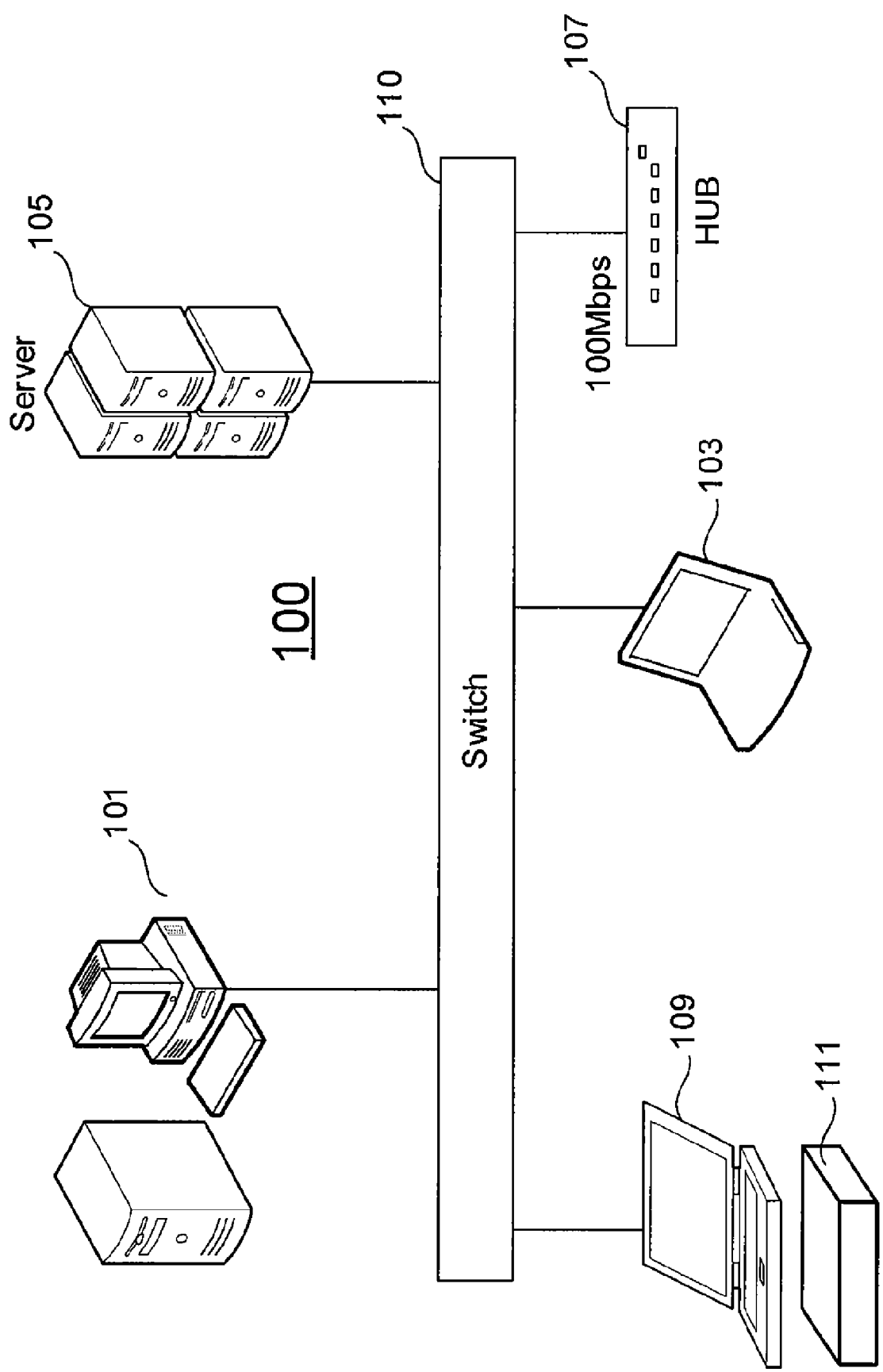
FIG. 1 illustrates an exemplary network environment.

FIG. 1 illustrates an exemplary network 100 in which notebooks 103 and 109 may operate. Network 100 may include a personal computer 101, a server 105, a data hub 107, a docking station 111, and a network switch 110. Switch 110 enables computer 101 to communicate with notebook 103, server 105, or hub 107. Switch 110 also enables notebook 103, server 105, and hub 107 to communicate with any other computer systems connected to the switch. Although not shown, computers 101 and 103, server 105, or hub 107 can be connected to other network systems such as LAN, WAN, or the internet.

On a high level, when data is received by switch 110 from computer 101, the data is examined to determine the data's destination address. Once the destination address and sending instructions are extracted, switch 110 makes a decision on where to send the received data. For example, computer 101 may want to send data only to server 105. In such a case, switch 110 will forward data received from computer 101 to server 105. In another example, computer 101 may want to send data to computer 103 and server 105. In this scenario, switch 110 will forward data transmitted by computer 101 to both the computer 103 and server 105. One skilled in the art will recognize other scenarios based on the discussion given herein.

There are various types of switching devices. Each type of switching device is specifically designed to function at a particular OSI layer. At layer 1, these switching devices are usually called "hubs" or "repeaters". The main function of a hub or a repeater is to broadcast incoming data to one or more ports or spokes of the hub. In addition to data broadcasting, the repeater also amplifies the original signal for re-transmission.

At layer 2, the switching device is often called a multiport bridge or more commonly a switch. Switches are designed to forward data based on a physical address known as media access controller (MAC) address embedded in the header of a data frame. Each network interface component (NIC) of a computer system or a switch has a unique 48-bit long MAC address that may look like "2E ID AC 01 00 01." Using the MAC address, a switch is able to route data to other switches or to a computer system with a matching MAC addresses.

A layer 3 switching device is called a router. Routers forward data packages based on their destination network address or internet protocol (IP) address. Similar to layer 2 switches, layer 3 routers are capable of learning addresses and maintaining address tables for referencing data packages with corresponding destinations.

Notebook 103 may be connected to network 100 using a RJ45 network port or through a wireless Ethernet port. Notebook 109 is similarly configured, but is also configured to connect to network 100 through a docking station 111, which also has a RJ-45 port connected to network 100.

Figure 2:
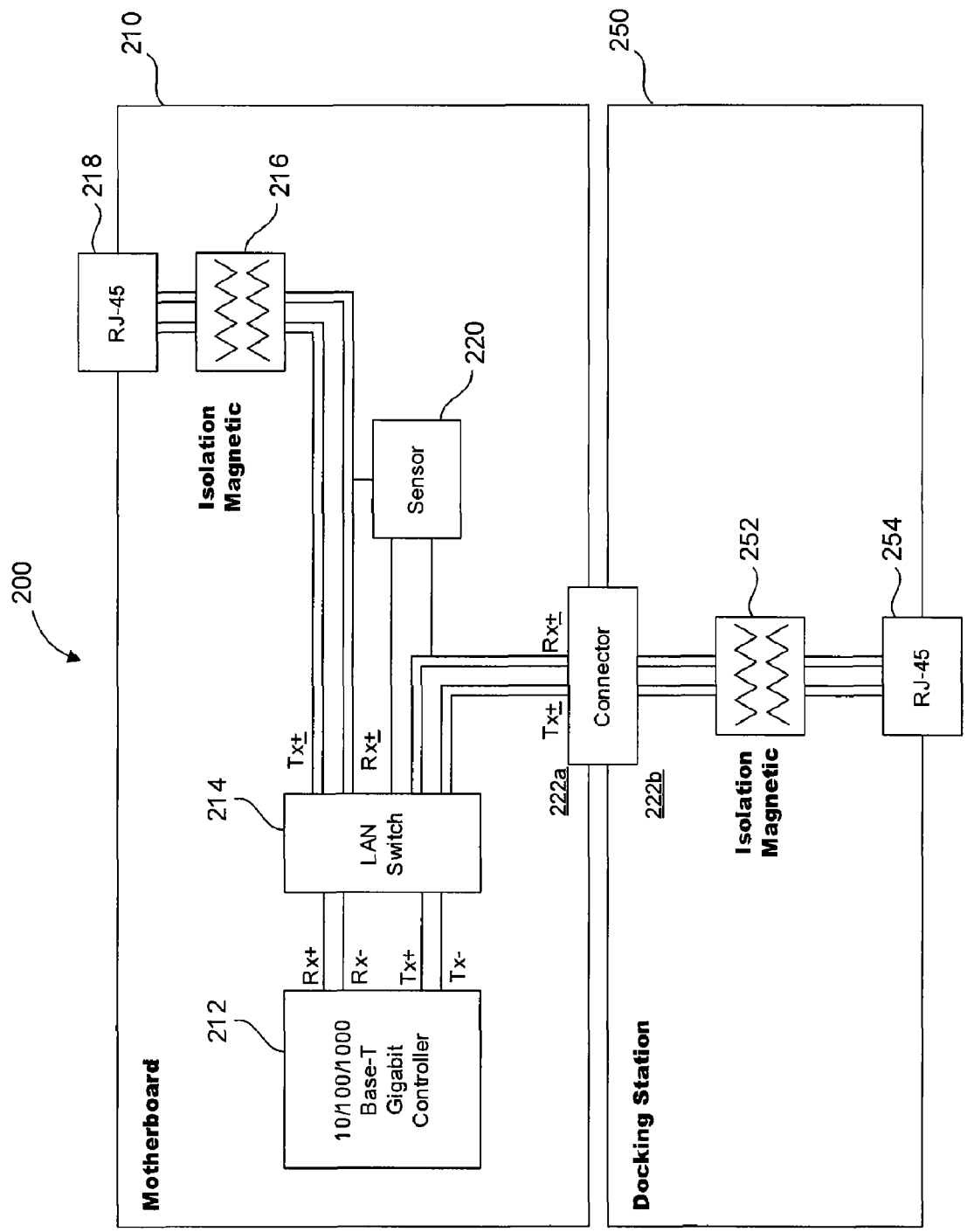
FIG. 2 illustrates a block diagram of an exemplary computer system.

FIG. 2 illustrates an exemplary computer system 200 that includes a notebook motherboard 210 and a docking station 250. Motherboard 210 includes physical layer device (PHY) 212, a switch 214, an isolation magnetic circuit 216, a RJ-45 connector port 218, and a link sensor 220. As shown, motherboard 210 is being implemented on notebook 109, but could also be implemented on notebook 103.

PHY 212 is responsible for transmitting and receiving data signals for the motherboard 210. During transmission, data signals that are received by switch 214 are either forwarded to RJ-45 port 218 or a docking station communication port 222 (shown as 222a and 222b in FIG. 2). Typically, a notebook motherboard includes a signal sensor, such as sensor 220, to detect the presence of an active link, either at the RJ-45 connector 218 or at the docking station through the connector 222a. When sensor 220 detects an active link at communication port 222a, it notifies switch 214 to exclusively switch data signals between PHY 212 and communication port 222a for transmission via the docking station. It should be noted that sensor 220 may also be integrated into switch 214. Similarly, when sensor 220 detects an active link at port 218, switch 214 is instructed to switch all data signals between PHY 212 and port 218.

To protect PHY 212 and other components of motherboard 210, data signals between PHY 212 and communication port 218 are filtered through an isolation magnetic circuit 216. In this manner, high voltage signals from the twisted pair cables may be filtered.

As shown in FIG. 2, docking station 250 includes communication port 222b, isolation magnetic circuit 252, and RJ-45 port 254. Communication port 222b is configured to mate with port 222a of motherboard 210. Similar to isolation magnetic circuit 216, isolation magnetic circuit 252 protects PHY 212 from potentially high voltage signals at port 254.

Figure 3:
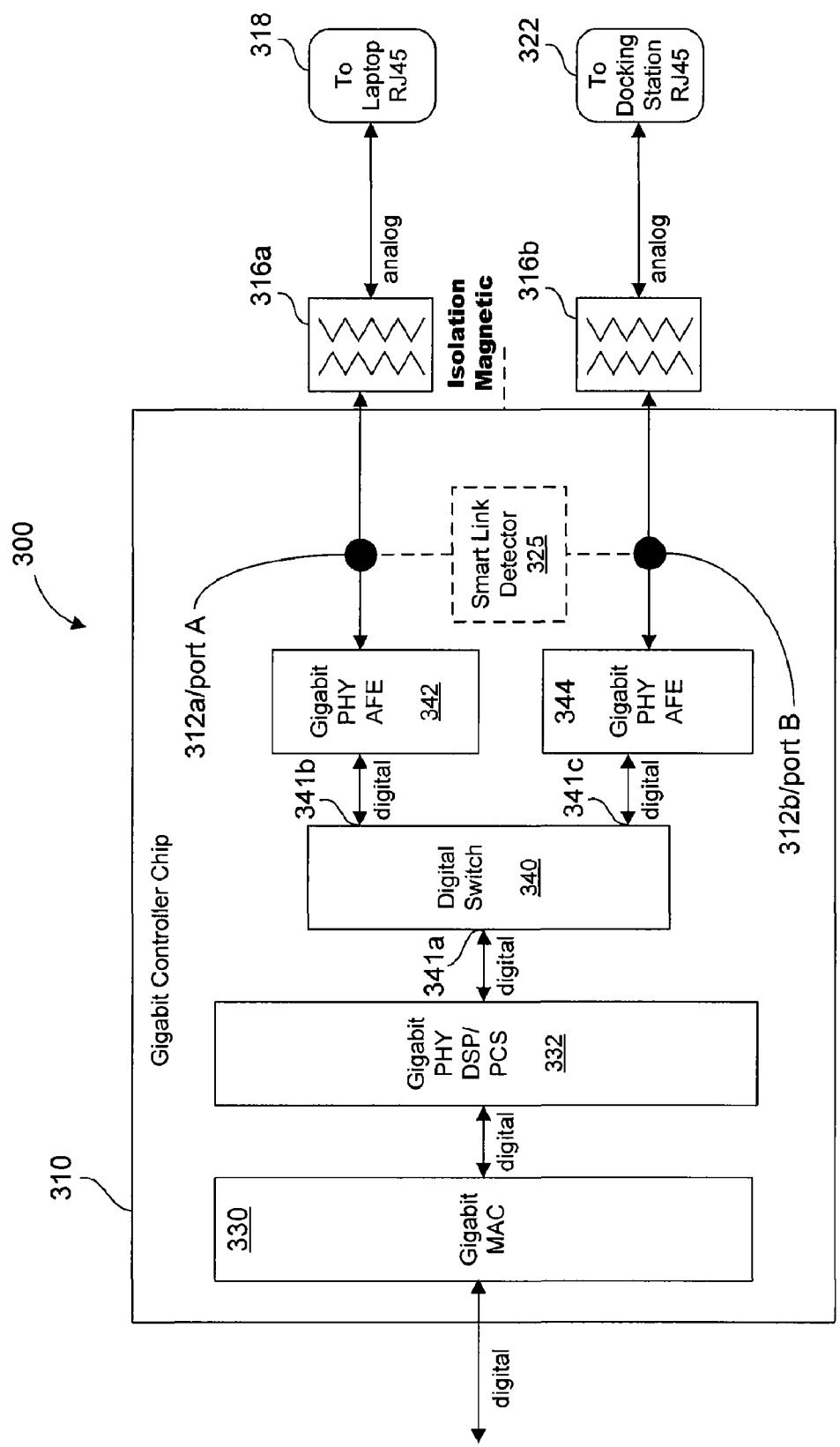
FIG. 3 illustrates a block diagram of a gigabit controller microprocessor according to an embodiment of the invention.

FIG. 3 illustrates a block diagram of a system 300 according to an embodiment of the present invention. System 300 includes a gigabit controller microprocessor 310, isolation magnetic circuits 316a-b, a RJ-45 port 318, and a docking station communication port 322. Isolation magnetic circuits 316a-b are coupled to input/output (V/O) ports 312a and 312b of gigabit controller 310. In this way, gigabit controller 310 is protected from high voltage signals at port 318 or port 322 and from other voltage anomalies. Alternatively, isolation magnetic circuit 316b can be physically located in the docking station instead of in system 300.

Gigabit controller 310 includes a media access controller (MAC) 330, a PHY digital signal processing (DSP) module 332, a digital switch 340, a first PHY analog front end (AFE) circuit 342, and a second PHY analog front end circuit 344. AFE circuits 342 and 344 are coupled to I/O ports 312a and 312b, respectively. Digital switch 340 is coupled between PHY DSP module 332 and AFE circuits 342 and 344. Switch 340 includes a first I/O port 341a, a second I/O port 341b, and a third P/O port 341c. I/O port 341a is coupled to PHY DSP 332. I/O port 341b is coupled to AFE circuit 342, and P/O port 341c is coupled to AFE circuit 344. In an embodiment, PHY DSP module 332 comprises a physical coding sublayer (PCS) in accordance to the IEEE 802.3 standard.

In gigabit controller 310, AFE circuits 342 and 344 constantly monitor I/O ports 312a and 312b for link energy to determine which port is active. If a link energy is detected on port 312a, switch 340 will forward data between PHY DSP 332 and AFE circuit 342. If a link energy is detected on port 312b, switch 340 will forward data between PHY DSP 332 and AFE circuit 344.

Switch 340 is a bidirectional digital switch. In this way, data may be transferred from PHY DSP 332 to AFE circuit 342 or from AFE circuit 342 to PHY DSP 332. Switch 340 may have more than 2 possible switching paths, as opposed to only 2 switching paths shown. For example, gigabit controller 310 may have "n" number of communication port similar to port 312 (collectively including ports 312a and 312b). In this scenario, gigabit controller 310 would have a corresponding "n" number of AFE, one for each communication port. Further, switch 340 may be implemented to work with a 10Base-T, 100Base-TX, 1000Base-T Ethernet system, or other communication standards. In an embodiment, switch 340 is a bidirectional digital multiplexer. It should be noted that other switching implementations could also be used to switch digital signals between PHY DSP 332 and AFE 342 or AFE 344. The implementation of a digital switch to switch digital signals between a first circuit and a plurality of second circuits should be apparent to one skilled in the relevant art.

The design of system 300 eliminates the need for an off-chip switch 214 between gigabit controller 310 and ports 318 and 322. The elimination of switch 214 reduces power consumption and the cost of system 300. Further, without the off-chip switch, circuit designers no longer have to worry about impedance mismatch at the interface of the PHY's AFE and the off-chip switch, which may cause signal distortions and amplitude lost, for example. Additionally, when an off-chip switch is used, the PHY has to be driven at a higher power level to offset for amplitude lost.

Further, the integrated switch of system 300 allows gigabit controller 310 to achieve higher cable reach as compared to system 200, which is partly contributed by the elimination of hybrid mismatch and transmit distortion caused by an off-chip switch.

In an alternative embodiment, system 300 further includes a connection sensor or a mechanical switch (not shown) and a link energy detector 325. The connection switch detects whether system 300 is connected to a docking station. Link energy detector 325 monitors each communication port to determine whether the link is active. If a port is determined to be inactive, system 300 may power down dedicated components for that communication port. For example, if communication port 312 is inactive, gigabit controller 310 may power down PHY AFE 342 and other support components such as a digital lock loop (not shown) dedicated to communication port 312a. In this way, system 300 may save power by minimizing the power usage of gigabit controller 310.

In system 300, special methods are used during the powering down or up process of the AFEs and related components to provide noiseless data switching between PHY DSP 332 and one of the plurality of AFEs 312a-n (312c-n are not shown). As mentioned above, n corresponds to the number of communication ports that gigabit controller 310 has.

Figure 4:
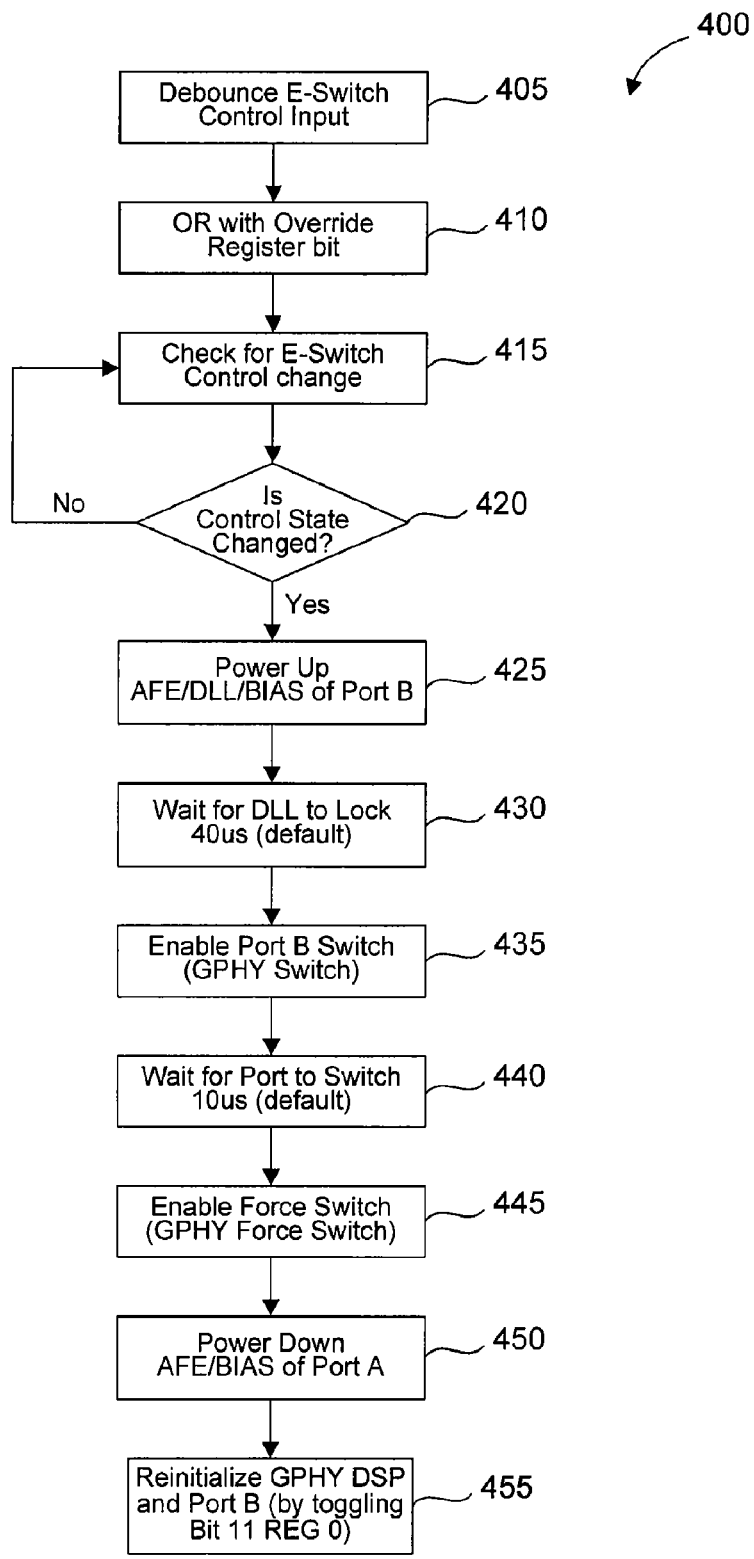
FIGS. 4-6 illustrate methods for switching data between a docking station I/O port and a stand-alone connector port, according to embodiments of the invention.

FIG. 4 illustrates a method 400 for noiseless switching of data from PHY DSP 332 to a communication port A then subsequently redirecting data transfer to and from DSP 332 and communication port B.

Method 400 begins at step 405. Prior to reading data from a connection sensor or switch (not shown), the connection switch is first de-bounced. The connection switch purpose is to detect the presence of the docking station. Typically, this connection switch is a mechanical switch, which tends to bounce for several microseconds prior to stabilizing at a closed state. To insure glitch free switching, data from the connection switch are not collected until the connection switch is de-bounced. This may be accomplished using commonly known switch de-bouncing circuitry or by executing a software module. Although a mechanical switch is described, other types of switches may also be used in place of the mechanical switch such as an optical switch or an electrical switch.

In step 410, system 300 may also override the PHY DSP register bit to minimize the amount of registers from resetting due to noises or to false switching instruction from the connection switch.

In step 415, system 300 constantly monitors the connection switch for any status change. In step 420, system 300 enters a loop and constantly cycles through steps 415 and 420 until the status of connection switch is changed. Once the control state or status of the connection switch is confirmed the process proceeds to step 425.

In step 425, if the connection switch indicates that the control state has changed (e.g. from port A to B, or B to A, or A to N) to port B for example, then dedicated devices for communication port B are powered up. For example, let's assume that the control state changes from port A to port B, then dedicated AFE 344 and DLL (not shown) for port B are powered up to prepare and support port B for communication.

In step 430, system 300 executes a wait for approximately 40 microseconds. This allows the DLL time to power up and stabilizes. The wait time does not have to be 40microseconds, other amount of times (e.g. 5 or 10 microseconds) could also be used as long as the DLL has stabilized or does not produce noise.

In step 435, digital switch 340 is configured to switch to port B, meaning port B is enabled. Alternatively, if a separate digital switch is used for each port, then the digital switch for port B is enabled.

In step 440, system 300 executes another wait for approximately 10 microseconds. This allows the switch to be properly enabled.

In step 445, system 300 forces switch 340 to enable the port B. This force switching procedure is executed regardless of whether port B of switch 340 has been enabled or not. If port B of switch 340 has already been enabled, this force enabling procedure would still be executed but would not have any negative effect. Method 400 continues to step 450.

In step 450, system 300 or gigabit controller 310 powers down dedicated devices to the previously enabled port. For example, when system 300 switches from port A to port B, dedicated DLL and AFE for port A are shutdown. This allows system 300 to operate efficiently.

In step 455, PHY DSP 332 is reinitialized to send and receive data from port B.

Figure 5:
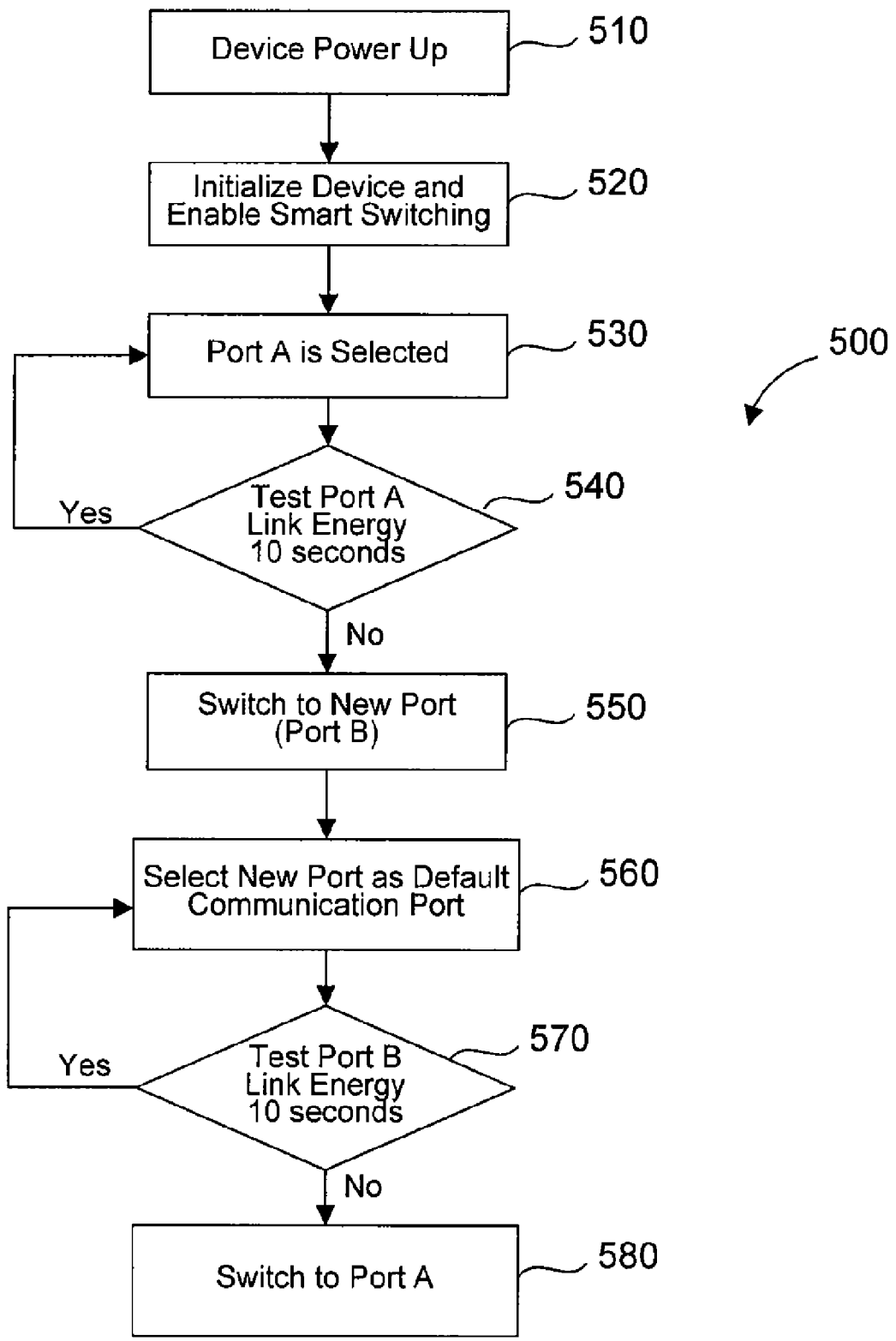

FIG. 5 illustrates a method 500 that may be implemented in system 300 to switch from one port to another. Method 500 commences at step 510.

In step 510, system 300 is powered up. In step 520, system 300 initializes essential systems for communication with one of the ports 312a-b. For example, PHY DSP 332 is initialized by preprogramming all proper registers and port A is also selected as the default communication port, as shown in step 530. Further, smart switching mode is enabled, which includes the implementation of smart delays as outlined in method 500.

In step 540, the communication link of port A is tested for link energy. This function is performed by link detector 325. If link energy is not detected within 10 seconds, the process proceeds to step 550. If link energy is detected, port A remains as the selected and active port. Further, system 300 continuously tests the link at Port A for activity (whether link energy is present). Although 10 seconds is used as the test wait time, other test wait times could also be implemented such as 2.61 ms up to 171 seconds.

Step 550 is executed if the wait time allotted has passed and link energy is not detected. If link energy is not detected at port A after 10 seconds (whatever the setting may be) then gigabit controller 310 switches to communication port B or any other port with a detected link energy. As mentioned, gigabit controller 310 may have multiple communication ports 312a-n. Once port B is selected at step 560, gigabit controller enters a loop, at step 570, to continuously test whether port B is active or has detectable link energy.

If a link energy is detected, gigabit controller 310 continues to select port B as the communication switch. If no link energy is detected, gigabit controller 310 switches to the new active port. As an example, port A has detectable link energy, thus gigabit controller switches to port A at step 580. Once this occurred, the link energy test loop, as outlined in steps 540 and 530, starts again.

System 300 is also configured to prioritize which communication port to use as the default data switching port when more than one communication ports are active. For example, system 300 may have two or more active ports such as port A and B. In an embodiment, port A is a RJ45 data port from a notebook and port B is a RJ45 port in a docking station. In this example, the notebook is docked to the docking station and both RJ45 ports are connected to an active external network. An example priority rule may stipulate that data is to be switched from the MAC to the first I/O port whenever the first I/O port is active. This rule applies regardless of the status of the second I/O port. Alternatively, the priority rule may stipulate that data is to be switched from the MAC to the second I/O port whenever the first I/O port is active, regardless of the second I/O port status.

Another exemplary priority rule may stipulate that data is to be switched from the MAC to the second I/O port when the following condition(s) is met: a) the second I/O port has a connected and active status while the first I/O port has an unconnected status; or b) the second I/O port has a connected and active status while the first I/O port has a connected but inactive status. Other priority rules could be also implemented that would not depart from the spirit and scope of this invention.

Figure 6:
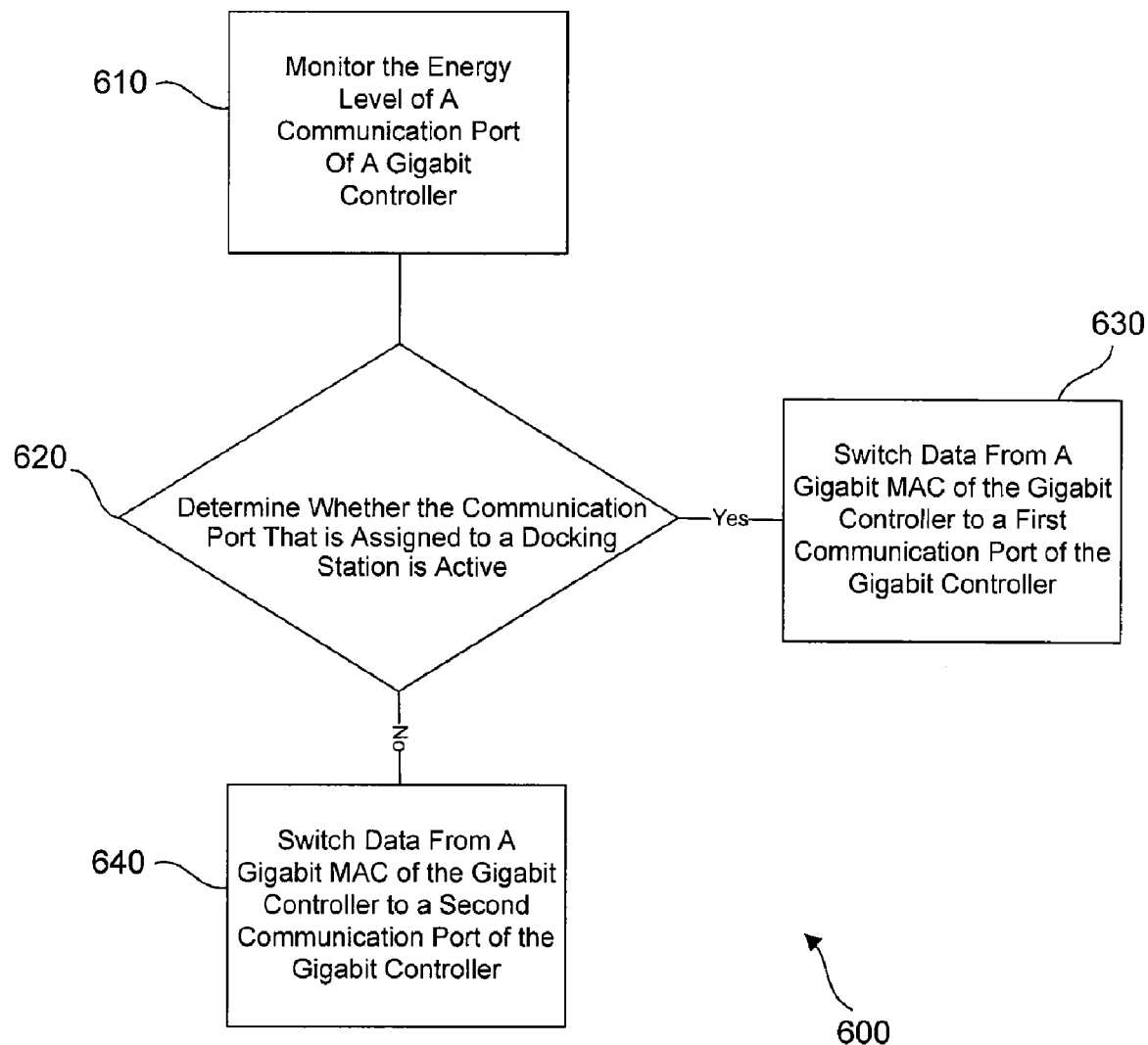

FIG. 6 illustrates a method 600 for switching data between a docking station I/O port and a stand-alone connector port within a gigabit controller, without the need for a separate LAN switch. In step 610, gigabit controller 310 monitors at least one of its input and output (I/O) ports. In an embodiment, gigabit controller 310 only monitors I/O port 312b, which is coupled to a notebook docking station. Alternatively, gigabit controller 310 may monitor all of its I/O ports.

In step 620, gigabit controller 310 determines whether I/O port 312b is active by measuring the energy level of the port. This may be done by measuring the voltage level of port 312b, for example.

In step 630, gigabit controller 310 switches data between gigabit MAC 330 and I/O port 312b if it has determined that port 312b is active.

In step 630, gigabit controller 310 switches data between gigabit MAC 330 and I/O port 312a if it has determined that port 312b is inactive. In this way, the need for an off-chip switch between gigabit controller 310 and ports 318 and 322 is eliminated. This helps to reduce power consumption and cost. As a further benefit to internal switching, gigabit controller 310 may achieve higher cable reach as compared to system 200.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system comprising:
    a first and a second communication port;
    a sensor configured to sense whether the first or second communication port is connected to an external device; and
    an integrated circuit comprising:
        a media access controller (MAC);
        a digital signal processing module configured to receive an information signal from the MAC and to output a processed signal;
        a first analog front end (AFE) coupled to the first communication port;
        a second AFE coupled to the second communication port;
        a switch assembly having a first and second switch configured to receive the processed signal, the first switch being coupled to the first AFE, the second switch being coupled to the second AFE; and
        a switch controller configured to delay enabling the first or second switch for a first predetermined amount of time after powering up the respective AFE based on a status of the sensor and whether the first or second communication port is active, and wherein the switch controller is configured to power off one of the AFEs having an inactive communication port;
    wherein the sensor has an output coupled to the switch controller, and the output is configured to be de-bounced prior to sending the status of the sensor to the switch controller.

2. The integrated circuit of claim 1, wherein the switch controller is configured to delay the first or second switch for a second predetermined amount of time after the first or second switch is enabled and prior to receiving the processed data from the digital signal processing module.

3. The integrated circuit of claim 1, wherein the first predetermined amount of time is approximately 40 micro seconds.

4. The integrated circuit of claim 2, wherein the second predetermined amount of time is approximately 10 micro seconds.

5. The integrated circuit of claim 1, wherein the switch controller is configured to determine whether the first or second switch is properly enabled and to force the first or second switch to go into an enabled mode if the first or second switch is not properly enabled.

6. The integrated circuit of claim 1, wherein the switch forwards the processed signal to the second AFE when the communication link at the second communication port is active.

7. The integrated circuit of claim 1, wherein the switch forwards the processed signal to the first AFE when the communication link at the first communication port is active.

8. The integrated circuit of claim 1, wherein the second communication port is coupled to a notebook docking station.

9. The integrated circuit of claim 1, wherein the switch is a digital multiplexer.

10. The integrated circuit of claim 1, wherein the first communication port is coupled to a communication connector.

11. The integrated circuit of claim 1, wherein the first communication port is coupled to an RJ-45 connector.

* * * * *